INVENTOR.
Victor E. Murray
BY
Murray, Sackhoff & Murray
ATT'YS

United States Patent Office 3,092,409
Patented June 4, 1963

3,092,409
EGG OPENER AND HOLDER
Victor E. Murray, Cincinnati, Ohio, assignor of one-half to Joseph L. Baarlear, Cincinnati, Ohio
Filed Oct. 21, 1957, Ser. No. 691,289
1 Claim. (Cl. 294—1)

This invention relates to improvements in egg holders and openers and has for its principal object the provision of a simplified and inexpensive device consisting of two identical cups each having a molded, one piece, resilient body.

Another object of the invention is to provide an improved two-part implement for holding a hot, boiled egg so that a crack may be started therein, said parts having egg-shell gripping means that sever and then hold the severed halves of the egg shell whilst the egg meats are separately emptied or spooned therefrom into a suitable container. My invention also provides a means whereby the emptied shells may be collapsed within their respective egg cups and thereafter deposited directly into a suitable refuse container.

Another object of the invention is to provide a resilient two-cup egg holder construction that will accommodate and hold all sizes of eggs and to further provide an effective egg shell gripping means around the mouth of each resilient holder cup to maintain the half shell within the section during the cracking and the egg meat extraction steps.

For further details of the invention reference may be made to the drawings in conjunction with the following specification which illustrate the preferred embodiment of said invention.

Figure 1:
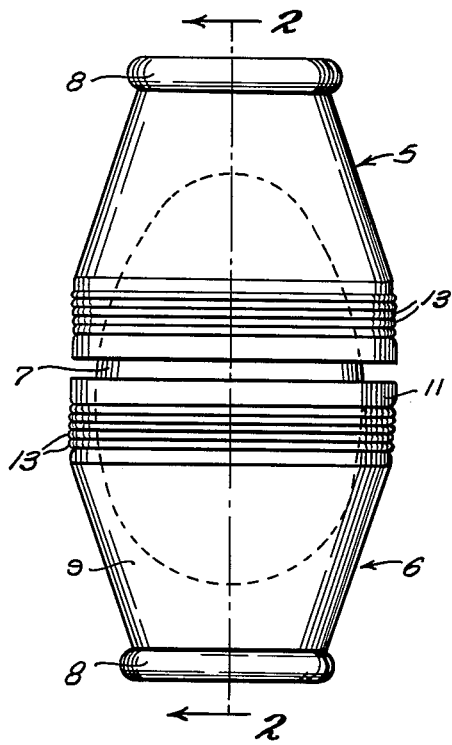
FIG. 1 is a side elevational view of my egg opener and holder shown in operative egg cracking and initial opening position.

Referring in detail to the drawing, my egg opener and holder comprises a pair of identical cups 5 and 6 both made from a single mold and formed in one piece from vulcanized rubber, or other resilient substance. This pair of identical cups is interchangeably fitted around or telescoped over a hot, boiled egg 7 in the manner illustrated in FIG. 1 of the drawing, it being noted that in operative position the open ends of the cups are spaced apart so that the central portion of the egg shell will be exposed between the adjacent ends of the cups.

As each egg holder cup 5 and 6 are similar in structure and operation a description of one of the cups will suffice to clearly set forth my invention.

Figure 2:
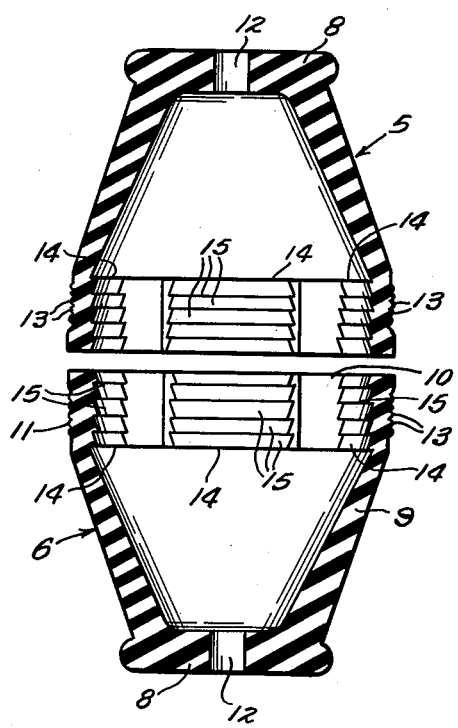
FIG. 2 is a sectional view taken on line 2—2 of FIG. 1, a showing of the hot boiled egg being omitted to clearly show the egg gripping means for the holder cups.

With reference to FIG. 2 it will be noted that the resilient, one piece body 6 of the lower egg holder cup has a relatively thick bottom 8 and an imperforate circular side wall 9 that flares outwardly from the bottom to the open mouth 10 of the holder cup. This side wall terminates at its upper end in a straight circular wall portion 11 that lies in a plane normal to the axis of the egg holder cup 6. As best shown in FIG. 2 it will be noted that the side wall 9 is relatively thick at its jointure with the bottom 8 and that said side wall becomes progressively thinner as it recedes from the base and approaches the straight circular side wall portion 11 around the mouth 10 of the egg holder cup. The bottom 8 of the cup 6 has a hole 12 formed therethrough whilst the exterior surface of the straight portion 11 is provided with a series of peripheral corrugations 13 in order that the cup may be readily gripped by the hand for manipulating it in the cracking and opening of an egg.

Figure 3:
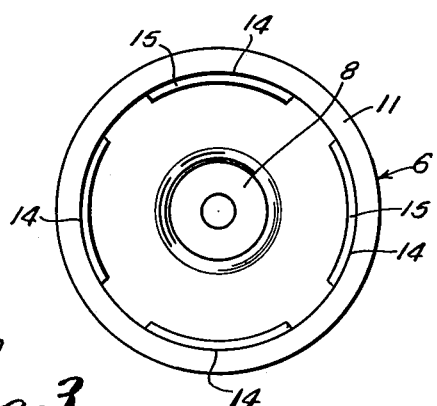
FIG. 3 is a plan view looking into the mouth of one of the egg holder cups.

Disposed in angularly spaced apart positions around the interior surface of the straight circular wall portion 11 of each egg holder cup are a number of angularly spaced apart egg gripping devices 14 molded as one piece with the body of said cup. Each gripping device ideally comprises a set of corrugations 15, longitudinally spaced apart and having their longitudinal dimensions running parallel to the free edge of the cup surrounding the mouth of the holder cup, and as indicated in FIG. 2 the corrugations are each V-shaped in section with the inside face thereof undercut so that the sharp crest of each corrugation faces toward the bottom of the cup and furnishes a readily displaceable means for receiving an egg and a strong gripping means to maintain the shell within the cup. With reference to FIG. 3 it will be seen that the sets of corrugations 14 project from the circular side wall 11 whereby the overall thinness of the side wall between the sets will be maintained to secure a resilient, pliable and flexible mouth for each egg holder cup whereby it will accommodate a large number of egg sizes whilst yieldably urging the egg gripping sets into firm contact with the shell portions thereof.

In the operation of the holder it is deemed advisable to dampen or wet the interiors of the two holder cups 5 and 6 before using them. Now holding a holder cup in each hand, opposed sections of a hot, boiled egg, or the like, are telescoped into the respective cups to the positions indicated in FIG. 1, leaving a small opening between the cups. A spoon or other implement is lightly tapped against an exposed portion of the egg shell whereafter the cups are pulled apart in relative angular directions from one another to crack the shell around the center of the egg and permitting severance of the egg into two sections thus retaining a half egg section in each cup and exposing the egg meat in both of the severed egg sections. The egg meat is then spooned out of the egg sections and thereafter the shells are collapsed by an inward pressure on the egg holder cups so that the collapsed shells may be directly emptied from their respective cups into a suitable refuse container, or the like.

It will therefore be understood that I have secured an extremely simplified, rugged and effective egg opening and holding implement by the provision of identical resilient cups made from a single mold and each having novel body structure and unitary egg gripping means which readily receive and positively grip and hold an egg upon its reception into the cup for opening the egg and subsequent removal of the egg meat and disposition of the emptied shell portions.

What is claimed is:

An egg holding device consisting of identical and unconnected cups each having a one-piece, resilient body formed with a relatively thick bottom and a circular, imperforate side wall flaring outwardly from the said bottom and terminating in a thin, circular mouth portion lying in a plane normal to the axis of the cup, the side wall of the cup becoming progressively thin as it recedes from the bottom and approaches the circular mouth portion, and a number of angularly spaced apart sets of egg gripping means each having a body raised from and of one piece with the body of the cup and projecting inwardly from the inner face of the circular mouth portion of the cup, each set of said gripping means consisting of a longitudinally spaced apart series of V-shaped corrugations formed in the body of the set and disposed parallel with the free edge of the mouth portion of the cup, and each corrugation having its inside face lying in a plane substantially parallel to the free end edge of the mouth portion of the cup.

References Cited in the file of this patent

UNITED STATES PATENTS

| | | |
|---|---|---|
| 808,507 | Blue | Dec. 26, 1905 |
| 1,261,706 | Condley et al. | Apr. 2, 1918 |
| 1,556,966 | Selig | Oct. 13, 1925 |
| 2,283,390 | Seldomridge | May 19, 1942 |
| 2,439,653 | Forbes | Apr. 13, 1948 |
| 2,457,912 | Murray | Jan. 4, 1949 |
| 2,462,208 | Meyer | Feb. 22, 1949 |
| 2,802,686 | Ramsey | Aug. 13, 1957 |

FOREIGN PATENTS

| | | |
|---|---|---|
| 538,894 | Canada | Apr. 2, 1957 |